US011296634B2

United States Patent
Frick et al.

(10) Patent No.: US 11,296,634 B2
(45) Date of Patent: Apr. 5, 2022

(54) METHOD AND SYSTEM FOR SENSORLESS DETERMINATION OF THE ORIENTATION OF THE ROTOR OF AN IRONLESS PMSM MOTOR

(71) Applicant: Lakeview Innovation Ltd., Buochs (CH)

(72) Inventors: Damian Frick, Zürich (CH); Sébastien Mariéthoz, Port (CH); Marko Tanaskovic, Valjevo (RS); David Lehmann, Heitenried (CH)

(73) Assignee: MAXON INTERNATIONL AG, Obwalden (CH)

( * ) Notice: Subject to any disclaimer, the term of this patent is extended or adjusted under 35 U.S.C. 154(b) by 8 days.

(21) Appl. No.: 15/682,202

(22) Filed: Aug. 21, 2017

(65) Prior Publication Data
US 2018/0054147 A1    Feb. 22, 2018

(30) Foreign Application Priority Data
Aug. 22, 2016    (CH) ..................... 01078/16

(51) Int. Cl.
*H02K 17/16*    (2006.01)
*H02P 6/10*    (2006.01)
(Continued)

(52) U.S. Cl.
CPC ............. *H02P 21/18* (2016.02); *H02P 6/08* (2013.01); *H02P 6/182* (2013.01); *H02P 21/13* (2013.01);
(Continued)

(58) Field of Classification Search
CPC .................. H02P 21/05; H02P 23/12
See application file for complete search history.

(56) References Cited

U.S. PATENT DOCUMENTS 5,559,419 A * 9/1996 Jansen ............... H02K 17/165
318/804
6,163,127 A    12/2000 Patel et al.
(Continued)

FOREIGN PATENT DOCUMENTS

CN    103368473 A    10/2013
EP    2698916 A2    2/2014
(Continued)

OTHER PUBLICATIONS

M. Shrodle et al., "New Rotor Position Detector for Permanent Magnet Synchronous Machines Using the "Inform"—Method," *ETEP* vol. 1, No. 1, Jan./Feb. 1991, pp. 47-53.
(Continued)

*Primary Examiner* — Eduardo Colon Santana
*Assistant Examiner* — Charles S Laughlin
(74) *Attorney, Agent, or Firm* — Crowell & Moring LLP; John C. Freeman, Esq.

(57) ABSTRACT

A method and system for sensorless determination of the orientation of the rotor of an ironless PMSM motor from a known rotor angle is described. The method and system include: specifying a rotor system according to the rotor angle; applying voltage pulses to the phases of the motor in the torque-forming direction of the rotor system; measuring the current in the phases of the motor; determining the expected back EMF along the flux-forming axis, based on the measured current; forming an integral of the expected back EMF by time integration of the expected back EMF along the flux-forming axis and/or a filter-based accumulation function; and determining the orientation of the rotor from the algebraic sign of the integral of the expected back EMF and/or the accumulation function.

19 Claims, 3 Drawing Sheets

(51) Int. Cl.
*H02P 21/18* (2016.01)
*H02P 6/182* (2016.01)
*H02P 21/13* (2006.01)
*H02P 21/30* (2016.01)
*H02P 6/08* (2016.01)
*H02P 21/34* (2016.01)

(52) U.S. Cl.
CPC .............. *H02P 21/30* (2016.02); *H02P 21/34* (2016.02); *H02P 2207/05* (2013.01)

(56) References Cited

U.S. PATENT DOCUMENTS

| | | | |
|---|---|---|---|
| 6,208,110 | B1 | 3/2001 | O'Meara et al. |
| 9,143,066 | B2* | 9/2015 | Yang .................. H02P 21/0007 |
| 2005/0151502 | A1 | 7/2005 | Quirion |
| 2010/0188033 | A1* | 7/2010 | Daboussi ................ H02P 21/18 318/400.34 |
| 2014/0246940 | A1* | 9/2014 | Murakami ............. H02K 1/274 310/156.49 |
| 2015/0084575 | A1 | 3/2015 | Magee |
| 2018/0054148 | A1 | 2/2018 | Zhao |

FOREIGN PATENT DOCUMENTS

| | | | |
|---|---|---|---|
| EP | 2924870 | A1 | 9/2015 |
| JP | 2003-088164 | A | 3/2003 |
| JP | 2003-164191 | A | 6/2003 |
| JP | 2008-508839 | A | 3/2008 |
| JP | 2009-261102 | A | 11/2009 |
| JP | 2015-186444 | A | 10/2015 |
| WO | WO 02/015229 | A1 | 2/2002 |
| WO | WO2010036744 | A1 | 4/2010 |

OTHER PUBLICATIONS

Duro Basic et al., "Current Controller for Low-Frequency Signal Injection and Rotor Flux Position Tracking at Low Speeds," *IEEE Transactions on Industrial Electronics*, vol. 58, No. 9, Sep. 2011, pp. 4010-4022.
European Search Report for European Patent No. EP17187061 dated Jan. 9, 2018 (2 pages).
G-D Andreescu et al., "Combined Flux Observer with Signal Injection Enhancement for Wide Speed Range Sensorless Direct Torque Control of IPMSM Drives," *IEEE Transactions on Energy Conversion*, vol. 23, No. 2, June. 2008, pp. 393-402.
Fernando Briz et al., "Rotor Position Estimation," *IEEE Industrial Electronics Magazine*, Jun. 2011, pp. 24-36.
European Search Report for European Patent No. EP17187059 dated Nov. 21, 2017 (2 pages).
J. Persson, M. Markovic and Y. Perriard, "*A New Standstill Position Detection Technique for Nonsalient Permanent-Magnet Synchronous Motors Using the Magnetic Anisotropy Method*," in IEEE Transactions on Magnetics, vol. 43, No. 2, pp. 554-560, Feb. 2007, DOI: 10.1109/TMAG.2006.887854.
J. Persson, Thesis No. 3221 (2005), "*Innovative standstill position detection combined with sensorless control of synchronous motors*", presented at École Polytechnique Fédérale De Lausanne, Section De Génie Électrique Et Électronique, 221 pages DOI: 10.5075/epfl-thesis-3221.
Notice of Preliminary Rejection dated Jul. 14, 2021 from corresponding Korean Patent Application No. 10-2017-0106234 (22 pages including English translation).

\* cited by examiner

METHOD AND SYSTEM FOR SENSORLESS DETERMINATION OF THE ORIENTATION OF THE ROTOR OF AN IRONLESS PMSM MOTOR

CROSS REFERENCE TO RELATED APPLICATION

This application claims priority to Swiss Patent Application No. 01078/16, filed Aug. 22, 2016, the entire disclosure of which is hereby incorporated herein by reference.

FIELD OF THE INVENTION

The present invention is directed to the field of controlling electronically commutated motors. The present invention relates to a method and a system for sensorless determination of the orientation of the rotor of an ironless permanent magnet synchronous machine (PMSM) motor.

BACKGROUND OF THE INVENTION

One of the main issues in controlling electronically commutated motors is determining the position of the rotor. Determining the position of the rotor involves determining the rotor angle, for which various methods are known from the prior art.

The position of the rotor is conventionally determined by position sensors such as Hall sensors or encoders. For these systems, it is known that the position sensors have an adverse effect on the reliability of the system, and also on the costs.

In order to reduce costs and increase the robustness of the system, various sensorless methods for determining the position of the rotor are therefore preferred, utilizing, among other things, anisotropy of the motor, saturation effects, asymmetry in the rotor structure, or rotor eccentricity in the position determination.

One option for sensorless determination is measurement of the induced voltage (EMF) by the rotating permanent magnet and evaluation of the zero crossings. However, this method has the disadvantage that a minimum rotational speed of the rotor is necessary to obtain a sufficiently large amplitude of the EMF for a sufficient signal/noise ratio for the position determination. In principle, this method is unsuitable for standstill conditions. In practice, the motor is therefore often set in motion using a specialized start-up procedure, without knowledge of the rotor position, in order to achieve a minimum rotational speed in which the measuring method may be used by means of the EMF.

Another method for determining the rotor position is the indirect flux detection by on-line reactance measurement (INFORM) method, developed by M. Schroedl and described, for example, in ETEP, Vol. 1, No. 1, January/February 1991, pp. 47-53, and which is suitable for standstill conditions as well as low rotational speeds. In the INFORM method, the current increases of the phases are evaluated based on specific test voltage vectors in order to determine the complex stator inductance in the various space vector directions. The rotor position is then determined from the stator inductance. One drawback of this method for ironless PMSM motors is the high currents that occur when the voltage vectors are applied, which may result in distortions of the currents and accompanying oscillating torques.

EP 2924870 A1 describes a method for determining the position of the rotor of a polyphase motor, i.e., the rotor angle, in particular at a standstill. The method comprises the steps: applying a voltage to the phases of the motor; measuring the current in the phases; and determining the rotor position based on the measured current. The determination of the rotor position is based on current values that are measured during a period when zero voltage is applied to the phases of the motor.

In the described method for determining the rotor position, the rotor angle is determined, whereby in principle the orientation (or polarity) of the rotor remains indeterminate. Thus, there is an uncertainty of 180° in determining the rotor position.

In known methods, the polarity of the rotor may be determined utilizing saturation effects, by injecting a current into the stator windings in an estimated d direction. For a current in the positive d direction, the saturation increases, and in the negative d direction, the saturation decreases. In the INFORM method, the polarity of the rotor may be determined, for example, by applying a current in the assumed d direction, the increase in current being greater when the current is injected in the positive d direction. The applied current must be high enough to cause a significant change in the magnetic flux; the higher the applied current, the better this method functions. In particular for motors with an ironless winding, this has the drawback that the current should have a magnitude that is high enough to damage the motor and the control electronics. This also has the adverse effect that when the assumed d direction of the applied current deviates from the actual d direction, a torque is generated which may possibly cause significant movement of the rotor.

In another known method described, for example, by D. Basic, F. Malrait, and P. Rouchon in IEEE Transactions on Industrial Electronics, Vol. 58, No. 9, pp. 4010-4022, the position and the polarity of the rotor are determined by injecting a harmonic current into the stator, which causes oscillations of the rotor. The induced oscillations of the EMF may be measured in the stator voltage at the injection frequency, and the spatial position of the rotor may be determined from the phase of this spectral component of the stator voltage. To determine the polarity of the rotor in a motor with magnetic saliency, additional harmonic current controllers at twice the frequency are used, whereby the polarity may be derived from the second harmonic voltage component. For motors without magnetic saliency, saturation effects must once again be used. One disadvantage of the methods based on rotor oscillations is that the oscillations may cause significant movements of the rotor, including deflections of up to +/−60°, in order to obtain reliable results.

SUMMARY OF THE INVENTION

Among the brushless motors, for numerous applications ironless or unslotted motors provide distinct advantages, such as no magnetic detent torque, high efficiency, low inductance, etc. However, along with these advantages, due to the properties of these motors, alternative methods for controlling the motor are generally required. For example, with regard to the position determination, the anisotropy in these motors is low, and a position determination based on reluctance anisotropy is not practicable at all, or only to a limited extent. Likewise, the known methods based on saturation effects have little or no use. Thus, it is well known that ironless permanent magnetic synchronous machine motors lack sufficient induced saliency to allow for sensorless determination of the orientation of a rotor at standstill based on induced saliency in general and saturation induced saliency in particular. This is explained in the thesis of Jan Persson, "Innovative Standstill Position Detection with Sensorless Control of Synchronous Motors," Federal Polytechnic School of Lansanne, 2005, pp. 92, 97, 129 and Persson et al., "A New Standstill Position Detection Technique for Non-Salient Permanent-Magnet Synchronous Motor Using the Magnetic Anisotropy, IEEE Transactions on Magnetism, Vol. 43, No. 2, February, 2007, pp. 554-560. It is also well known from WO 2002/015229 A1 that for ironless permanent magnetic synchronous machine motors there is no iron saturation.

In addition, for important applications of ironless PMSM motors, for example in medical technology such as dentistry, or insulin pumps, large movements are undesirable or not allowed. Therefore, position determination methods for standstill conditions are desirable in which only small movements are produced, whereby for the reasons stated above the methods should function without sensors.

These considerations apply for determining the rotor angle as well as for determining the orientation or the polarity of the rotor.

Therefore, a method is provided for determining the orientation of an ironless PMSM motor, which in this regard at least partially improves the prior art.

In one implementation, a method is disclosed for sensorless determination of the orientation of the rotor of an ironless PMSM motor from a known rotor angle, the method comprising:
  a) specifying a rotor system according to the rotor angle;
  b) applying voltage pulses to the phases of the motor in the torque-forming direction of the rotor system;
  c) measuring the current in the phases of the motor;
  d) determining the expected back EMF along the flux-forming axis, based on the measured current;
  e) forming an integral of the expected back EMF by time integration of the expected back EMF along the flux-forming axis and/or a filter-based accumulation function;
  f) determining the orientation of the rotor from the algebraic sign of the integral of the expected back EMF and/or the accumulation function.

Thus, in one implementation, the method does not use a sensor at all in the determination of the orientation of the rotor. In this regard, in a specific implementation, the method and the PMSM motor are sensor free and the determination of the orientation of the rotor does not use any sensor. The rotor system is known to those skilled in the art as the fixed-rotor coordinate system obtained by Park transformation. In one implementation, the rotor system is the d/q rotor system known from the field of motor control, wherein the flux-forming direction is the d direction or d axis, and the torque-forming direction is the q direction or q axis.

The method may determine the orientation of the rotor with a small movement of the rotor. Compared to the prior art, in which for determining the polarity a current is applied in the flux-forming direction, and which must be high in order to obtain a significant signal, which may be harmful in particular for ironless motors, or in which the orientation is determined based on rotor oscillations, which causes large movements, in the method disclosed a small movement of the rotor is advantageously ensured due to the voltage pulses being applied in the torque-forming direction. Therefore, an estimation of the torque-forming direction that deviates from the actual position advantageously has only a minor effect on the torque that is effectively produced. Using a known rotor position or a known rotor angle for determining the orientation offers the further advantage that fairly large undesirable movements of the rotor, which could be necessary for determining the rotor angle, may be reduced, and only the movements that are required for determining the orientation are carried out. In addition, by forming the integral of the expected back EMF, the individual voltage pulses may remain small, thus reducing the risk of unwanted large movements. The orientation may be determined from the algebraic sign of the integral of the expected back EMF, whereby for a negative algebraic sign it may be concluded that the flux-forming direction of the rotor is opposite the flux-forming direction that is specified according to the rotor angle, and a 180° correction of the specified flux-forming direction is necessary. For a positive algebraic sign, it may be concluded that the specified flux-forming direction corresponds to the actual flux-forming direction of the rotor.

The signal/noise ratio may be increased by forming a filter-based accumulation function or by some other analogous method. In certain applications, the accumulation function may assume only values from specific time periods.

The method may be particularly suited for ironless or unslotted motors. It is well known in the art that an ironless motor is referred to an unslotted motor and vice versa. As is well known in the art, an ironless/unslotted PMSM motor is a motor that lacks a core of permeable material on which windings of the stator are wound and so the motor lacks slots. Note that published reference WO 2002/015229 A1 supports such an understanding of the meaning of an ironless or unslotted motor, particular at page 2 of the reference. The invention described and claimed herein with respect to ironless/unslotted PMSM motors shall be understood to have the attributes described in this paragraph. Other types of motors are contemplated. For example, it is clear to those skilled in the art that the method may also be advantageously used for motors having an iron core.

The method may be likewise advantageously suited for polyphase motors, regardless of the number of poles; for example, the method may be suitable for two-pole as well as four-pole motors.

The summed movement of the rotor due to application of the voltage pulses may be less than 25°, such as less than 10°. In other particular implementations, the summed movement of the rotor is less than 5°.

In one implementation of the method, only the measured current when zero voltage is applied to the phases of the motor is used for determining the expected back EMF along the flux-forming axis.

The current is generally measured in the period between two voltage pulses, in which the voltage is zero. Using the current that is measured when zero voltage is applied to the phases of the motor has the advantage that the dependency on the system input is reduced, since voltage terms no longer appear in the determination of the current values. Instead, the relationship between consecutive system outputs is advantageously used.

This has the advantageous result that the system is more robust against noise and voltage distortions. Moreover, the measurements may be carried out in a shorter time.

The application of the voltage pulses may be terminated as soon as the integral of the expected back EMF and/or the accumulation function have/has reached a predetermined threshold value.

The voltage pulses may be applied only until the integral of the expected back EMF and/or the accumulation function are/is large enough that the algebraic sign of the integral may be determined. The movement of the rotor may thus continue to be held to a minimum.

In one implementation of the method, after the application of voltage pulses, at least one counter pulse is applied that moves the rotor back into the original position.

Applying the at least one counter pulse has the advantage that it is ensured that the rotor is brought back into its original position after the orientation is determined. The at least one counter pulse may be designed in such a way that the applied voltage pulses are exactly compensated for. Since preferably no measurement and/or evaluation is carried out when the rotor is moving back, the counter pulses may have a larger amplitude than the voltage pulses for determining the orientation. Alternatively or additionally, the period between the counter pulses may be shorter than the period between the voltage pulses. Alternatively or additionally, a single counter pulse may be applied that compensates for a series of voltage pulses.

In one implementation, the counter pulses are applied in the negative torque-forming direction of the specified rotor system.

In another implementation, a counter pulse is applied in the negative torque-forming direction of the specified rotor system, the counter pulse being an integral of the applied voltage pulses.

Alternatively, the counter pulse may be applied in the flux-forming direction of the given orientation of the rotor. Since the orientation of the rotor is known at this point in the method, the counter pulse may be applied in the flux-forming direction of the given orientation of the rotor in order to rotate the rotor back into its original position.

In one implementation, a compensating pulse is applied after application of the at least one counter pulse. The compensating pulse may be used for allowing the currents in the phases of the motor brought about by the at least one counter pulse to decay more quickly than without a compensating pulse. The compensating pulse is preferably applied along the direction of the voltage pulses that are applied for the orientation determination, e.g., preferably along the torque-forming direction of the rotor system.

In one implementation, the voltage pulses are rectangular pulses, with the amplitude of the voltage pulses being varied over time.

The amplitude of the voltage pulses may be varied as a function of the amplitude of the expected back EMF along the flux-forming axis.

The amplitude of the expected back EMF generally depends on the moment of inertia of the mechanical components of the system or of the motor, which typically is not known, and the amplitude of the applied voltage pulses. This dependency may be advantageously utilized to increase the speed of the motor and speed up the determination of the orientation of the rotor. In particular, the amplitude of the voltage pulses over time may be increased as a function of the amplitude of the expected back EMF in order to speed up the determination of the orientation of the rotor.

Alternatively or additionally, the time is varied between two voltage pulses.

The option of varying the applied voltage pulses, in particular as a function of the given expected back EMF, is advantageous in that an additional control option is provided and the flexibility of the method is increased.

In one implementation of the method, the expected back EMF along the flux-forming axis is filtered.

The filtering may be used for reducing the noise of the measurement, and is intended to increase the signal/noise ratio.

In one implementation, the measured current is averaged over a number of measuring points in order to determine the expected back EMF along the flux-forming axis.

Alternatively or additionally, a Kalman filter or a Luenberger observer is used for determining the expected back EMF along the flux-forming axis.

In one implementation of the method, the known rotor angle is determined according to the following steps:
a) applying voltage pulses to the phases of the motor;
b) measuring a current in the phases;
c) determining the rotor angle from the measured current, wherein only the measured current when zero voltage is applied to the phases of the motor is used.

This method for determining the known rotor angle has the advantage that the determination is based on the relationship between consecutive system outputs and the dependency on the system input. In addition, the robustness against noise and voltage distortions may be increased. The rotor angle determined in this way may increase the accuracy of the position of the rotor, which has a positive effect on the determination of the orientation of the rotor, without reducing the efficiency of the method.

BRIEF DESCRIPTION OF THE DRAWINGS

The accompanying drawings, which are incorporated in and constitute a part of this specification, illustrate various aspects of the invention and together with the description, serve to explain its principles. Wherever convenient, the same reference numbers will be used throughout the drawings to refer to the same or like elements. The figures show the following.

DETAILED DESCRIPTION OF EMBODIMENTS

Figure 1A:
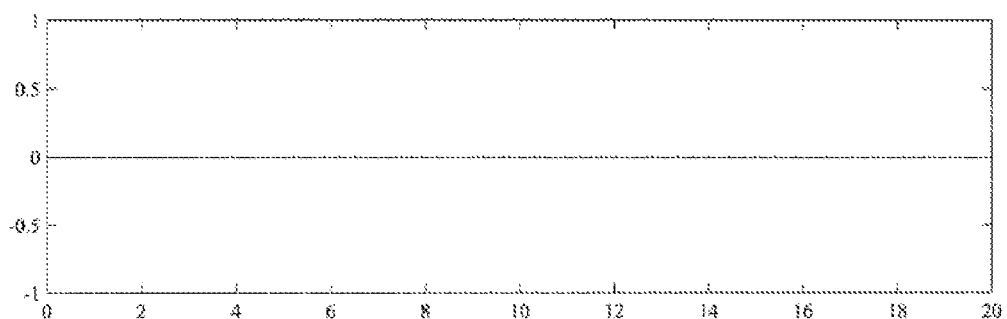
FIGS. 1a-b shows a schematic illustration of the applied voltage pulses in the d/q system.
Figure 1B:
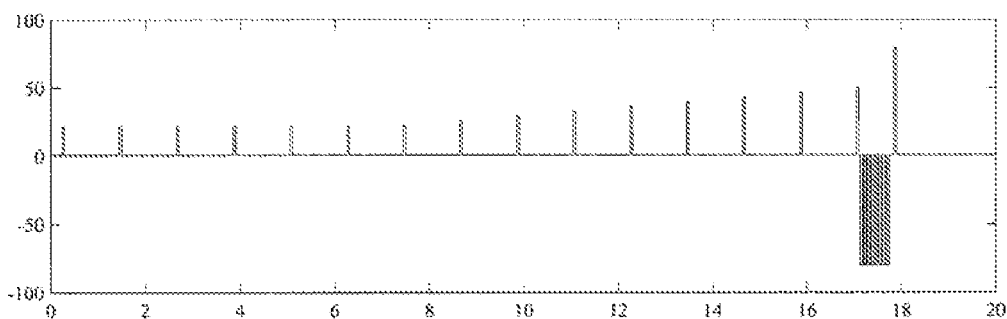

FIGS. 1 a-b show a schematic illustration of the applied voltage pulses in the specified d/q system of the rotor, which has been specified according to the known rotor angle. FIG. 1a shows the voltage (y axis, in arbitrary units) along the specified d axis with respect to time (x axis, in ms). FIG. 1b shows the voltage (y axis, in arbitrary units) along the specified q axis with respect to time (x axis, in ms). The rotor angle is obtained from a position determination method that is carried out prior to the orientation determination, e.g., before the voltage pulses are applied. A direction along the known rotor axis is arbitrarily specified as the orientation of the d axis, so that an uncertainty of 180° remains. As is apparent in FIGS. 1a-b, a series of voltage pulses is applied along the q direction of the specified d/q system of the rotor. Positive voltage pulses are applied up to t=17 ms. In the shown exemplary implementation of the method, the amplitude of the positive voltage pulses is varied, but the period of these voltage pulses is kept constant. Alternatively or additionally, the period of the voltage pulses may also be varied. The back EMF is generally a function of the moment of inertia of the mechanical system, which typically is not known, and of the amplitude of the voltage pulses. The voltage pulses may therefore be varied, depending on the output of the back EMF, to allow the orientation of the rotor to be determined more quickly. After t=17 ms, the orientation of the rotor is determined. After the orientation of the rotor is determined, a series of negative counter pulses is applied, wherein all negative counter pulses have the same amplitude. The counter pulses are selected in such a way that the rotor, which has been moved by an angle a by the series of positive voltage pulses, is moved back into its original position. Since no signals have to be evaluated during the return of the rotor into the original position, the period between the counter pulses may be kept short. Likewise, the amplitude of the counter pulses may be selected to be larger than the positive voltage, since larger movements per voltage pulse are tolerable. After the series of negative counter pulses, a compensating pulse is applied that is used for allowing the currents in the phases of the motor brought about by the counter pulses to decay more quickly than it would be the case without the compensating pulse.

Figure 2A:
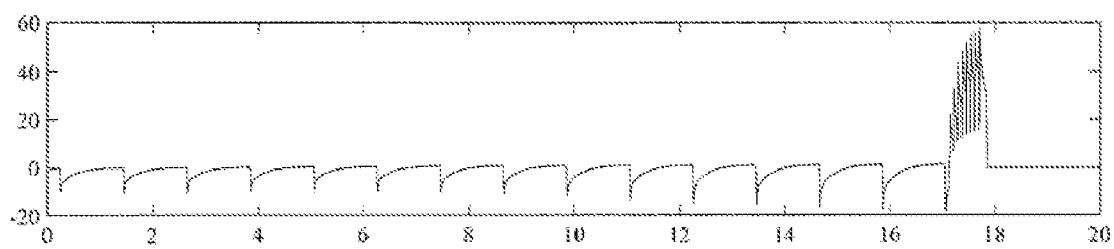
FIGS. 2a-c shows an illustration of the measured currents in the phases of the motor.
Figure 2B:
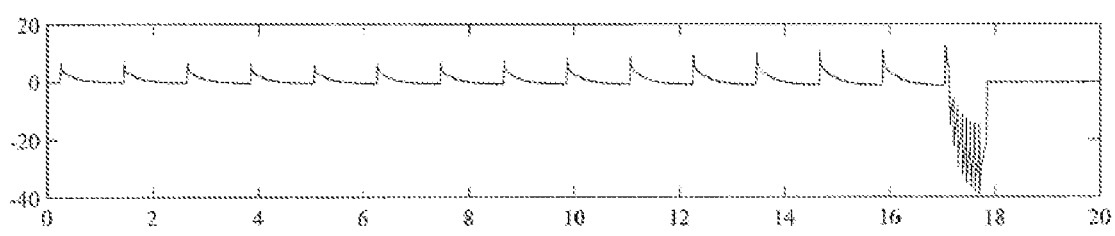
Figure 2C:
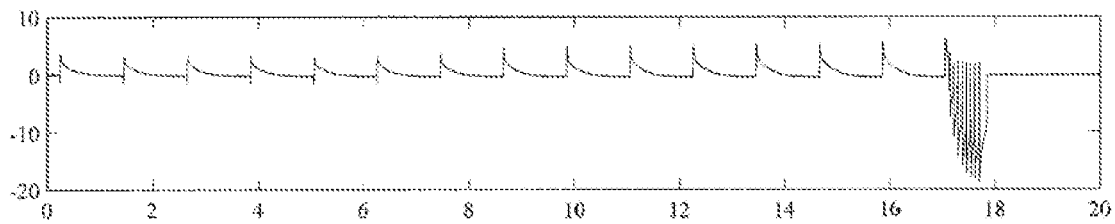

FIGS. 2a-c show the measured current in the three phases of the motor (a, b, c currents). FIG. 2a shows the current (y axis, in arbitrary units) in the a phase with respect to time (x axis, in ms). FIG. 2b shows the current (y axis, in arbitrary units) in the b phase with respect to time (x axis, in ms). FIG. 3c shows the current (y axis, in arbitrary units) in the c phase with respect to time (x axis, in ms). The current along the d axis of the specified d/q rotor system allows the expected back EMF along the d axis to be determined. For this purpose, the currents in the phases of the motor are transformed into the d/q rotor system as follows:

$$\begin{pmatrix} t_d \\ t_q \end{pmatrix} = \begin{pmatrix} \cos(\theta) & \cos\left(\theta - \frac{2\pi}{3}\right) & \cos\left(\theta - \frac{4\pi}{3}\right) \\ -\sin(\theta) & -\sin\left(\theta - \frac{2\pi}{3}\right) & -\sin\left(\theta - \frac{4\pi}{3}\right) \end{pmatrix} \begin{pmatrix} t^a \\ t^b \\ t^c \end{pmatrix},$$

where θ denotes the previously determined rotor angle.

Figure 3A:
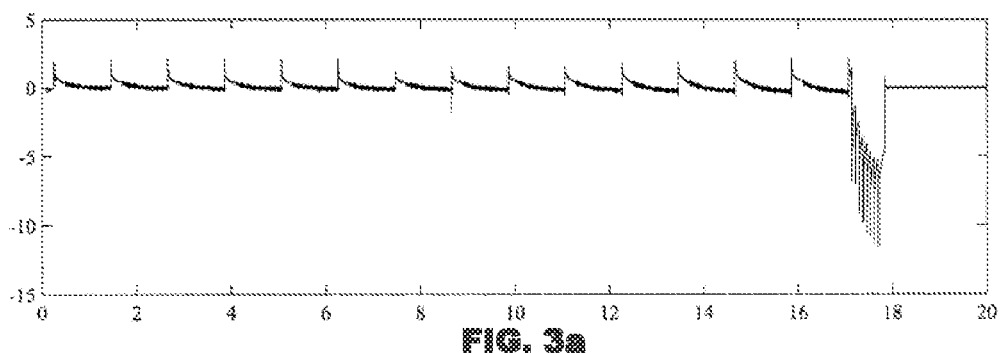
FIGS. 3a-b shows an illustration of the currents transformed into the d/q system.
Figure 3B:
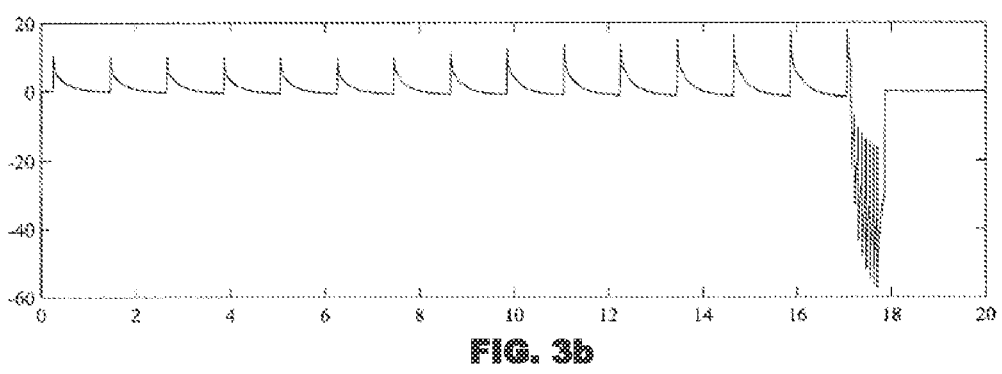

FIGS. 3a-b show the currents transformed into the specified d/q rotor system. FIG. 3a shows the current (y axis, in arbitrary units) along the specified d axis with respect to time (x axis, in ms). FIG. 3b shows the current (y axis, in arbitrary units) along the specified q axis with respect to time (x axis, in ms). The expected back EMF along the d axis may be determined from the current along the d axis; in the implementation shown, the current is applied when zero voltage is applied to the phases of the motor. The following dynamic equation describes the current of the relevant current samples (in the periods with zero voltage):

$$t_d^{R+1} = a \ast t_d^R + \text{GEMK}_d,$$

where a is a motor parameter that is a function of the resistance and the inductance, and may be determined by known motor identification methods. $\text{GEMK}_d$ is the back EMF along the d axis, or the back EMF projected onto the d axis of the specified d/q rotor system, which is determined from the measured current. The various periods are numbered with the term R; e.g., the back EMF may be determined from consecutive current samples along the d axis. The expected back EMF along the d axis for the orientation determination may be computed directly from the dynamic equation and averaged over multiple measuring points. Alternatively or additionally, a Kalman filter or a Luenberger observer may be used.

Figure 4A:
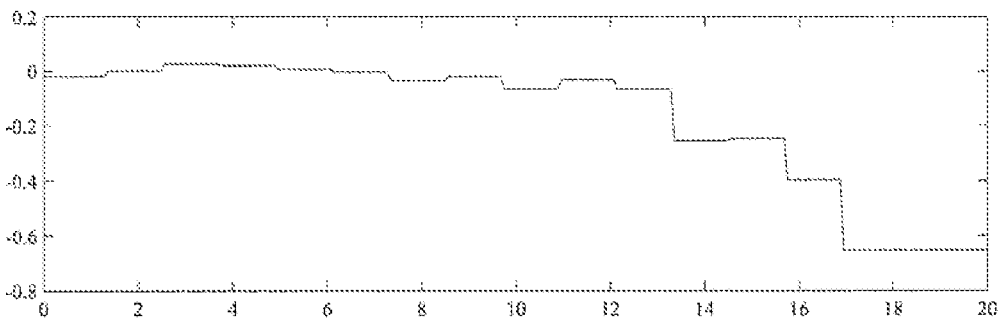
FIGS. 4a-b show an illustration of the expected back EMF along the d axis, and of the integral of the expected back EMF.
Figure 4B:
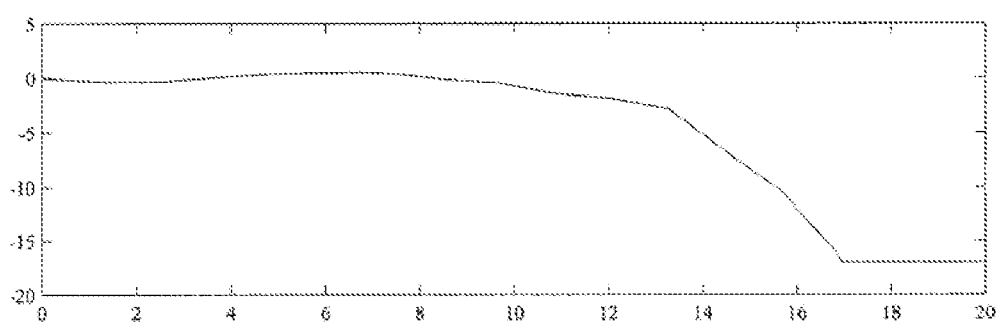

FIG. 4a shows the expected back EMF along the d axis, obtained from the dynamic equation and by averaging. The back EMF (y axis, in arbitrary units) is plotted with respect to time (x axis, in ms). FIG. 4b shows the integral of the expected back EMF, which is determined from the expected back EMF along the d axis from FIG. 4a by time integration. The integral of the back EMF (y axis, in arbitrary units) is plotted with respect to time (x axis, in ms). At t=17 ms, the integral of the expected back EMF reaches a predetermined threshold value at which the algebraic sign of the integral of the back EMF is determined. In the figure, the algebraic sign of the integral upon reaching the threshold value is negative, from which it may be determined that the orientation of the rotor lies opposite to the specified d axis. After the threshold value is reached and the orientation of the rotor is determined at t=17 ms, the application of the voltage pulses is interrupted, and instead, a series of negative counter pulses is applied in the q direction according to FIG. 1 in order to rotate the rotor back into its original position. As is apparent in FIG. 4a, as a result of varying the amplitude of the voltage pulses, the amplitude of the expected back EMF along the d axis increases, and the predetermined threshold value is reached sooner. The determination of the orientation of the rotor may thus be speeded up, while at the same time the movement of the rotor may be kept small.

Figure 5:
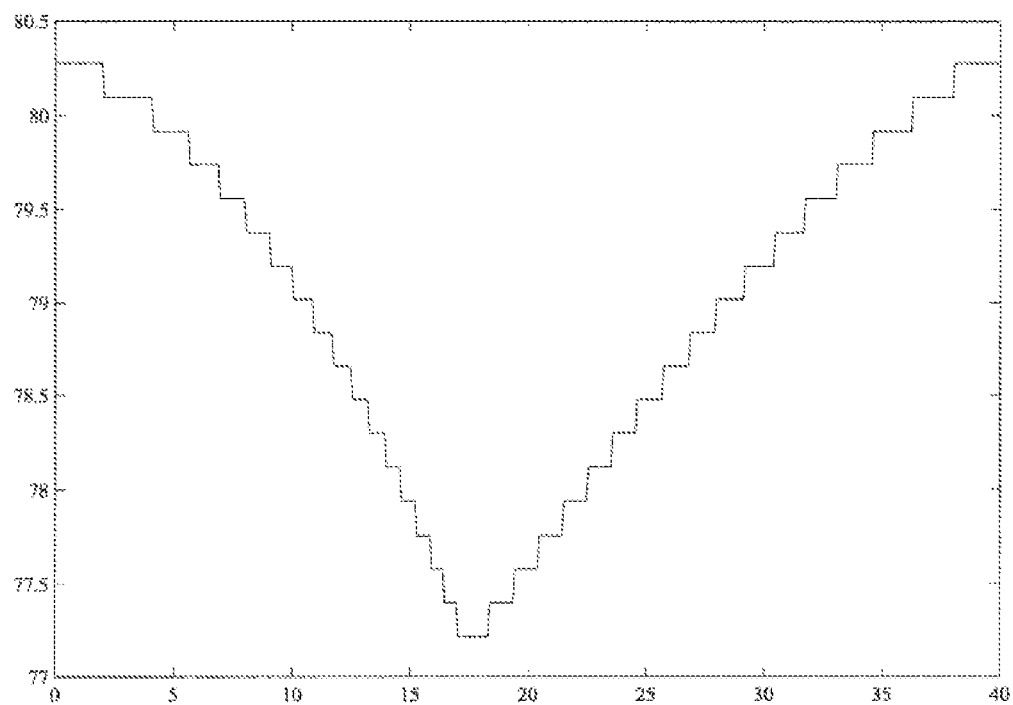
FIG. 5 shows an illustration of the shift in the rotor position during the application of the voltage pulses.

FIG. 5 shows the shift in the position of the rotor during the method for determining the orientation of the rotor shown in FIGS. 1 through 4. The shift angle (y axis, in degrees [°]) is plotted with respect to time (x axis, in ms). Due to the application of voltage pulses, the rotor position, e.g., the rotor angle, changes in steps. The rotor angle shown in the figure was determined by an incremental encoder in order to independently illustrate the development of the position during the method for determining the orientation. However, the incremental encoder is generally not a component of the method according to the invention, and is not necessary for determining the orientation of the rotor. The figure shows that the voltage pulses result in only minor shifts in the rotor angle, and that the overall movement of the rotor of less than 4° is mechanical.

The maximum in the shift is reached at t=17 ms, when the application of the voltage pulses is terminated. The counter pulses result in a stepwise backward movement of the rotor into its original position. Although the counter pulses according to FIGS. 1a-b are applied over a short time period of approximately 1 ms, approximately 20 ms are required for the entire backward movement, due to the inertia of the mechanical system.

Figure 6:
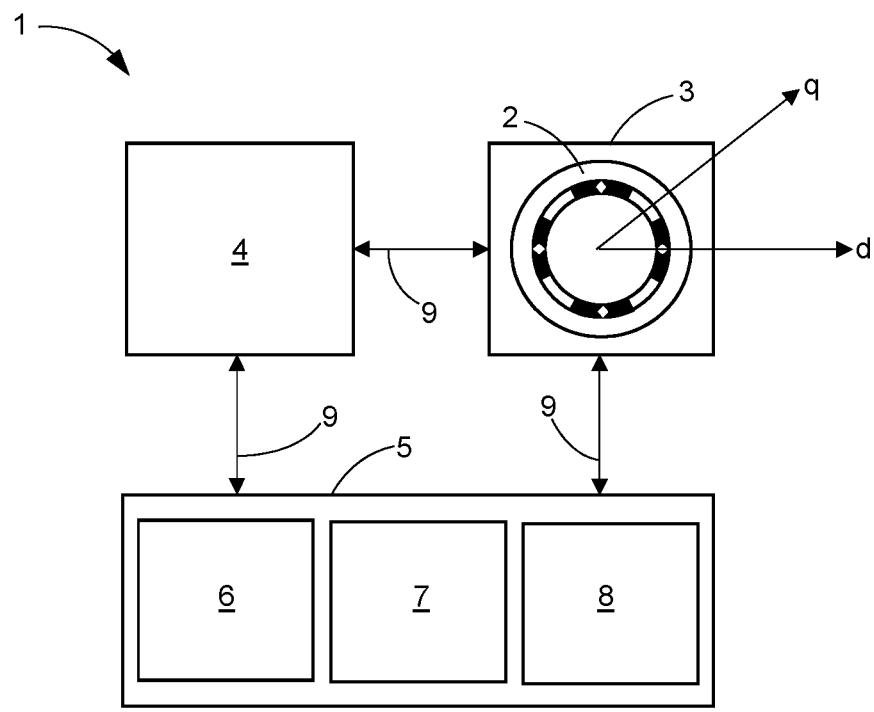
FIG. 6 shows a schematic illustration of a motor system according to an implementation.

FIG. 6 shows a schematic illustration of a motor system 1 according to an implementation of the present invention. The motor system 1 is adapted for determining the orientation of a rotor 2 of an ironless PMSM motor 3 of the motor system 1. The motor system 1 further comprises a measuring device 4 and a control device 5. The measuring device 4 is adapted for measuring the current in the phases of the motor 3. The control device 5 comprises a processing unit 6 for forming an integral of the expected back EMF and/or the filter-based accumulation function based on the measurements, a memory unit 7 for storing a predetermined threshold value of the integral of the expected back EMF, and a comparator unit 8 for comparing the integral of the expected back EMF to the predetermined threshold value. The processing unit 6 is adapted for digitally and/or analoguely generating the integral. The control device 5 is further adapted for applying voltage pulses to the phases of the motor 3. FIG. 6 illustrates the separate elements of the processing unit 6, the memory unit 7, and the comparator unit 8, with the processing unit 6 being in communication with memory unit 7 and comparator unit 8. Alternatively, the functions performed by these units may be in a single element within control device 5.

The processing unit 6 may comprise a microprocessor or other type of processor, and a computer-readable medium that stores computer-readable program code (e.g., software or firmware) executable by the (micro)processor, logic gates, switches, an application specific integrated circuit (ASIC), a programmable logic controller, and an embedded microcontroller, for example. In particular, the processing unit 6 may be configured to perform the analysis (such as the analysis of the measurements, the determination of the expected back EMF, the forming of the integral, the determination of the orientation, etc.) and the control one or more aspects of the motor as described herein (such as applying at least one counter pulse to move the rotor back into the original position). Further, the processing unit 6 may receive one or more inputs (such as one or more current measurements) in order to determine one or more aspects of the motor system 1 (e.g., the determination of the orientation of the rotor). Further, the processing unit 6 may be configured to apply voltage pulses to the phases of the motor 3. In this regard, the processing unit 6 may comprise logic, such as computable executable instructions, which enable the functionality disclosed herein. The comparator unit 8 may comprise a microprocessor or other type of processor (similar to processing unit 6) in order to perform the comparison functionality.

Energy and/or data transmission lines 9 of the motor system 1 allow for transmitting electrical energy, data and/or measurement values between the motor 3, the measuring device 4 and the control device 5.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the preferred embodiments described herein can be used alone or in combination with one another.

The invention claimed is:

1. A method for sensorless determination of orientation of a rotor of an ironless permanent magnet synchronous machine (PMSM) motor from a known rotor angle during standstill of the rotor, the method comprising:
   a. specifying a rotor system according to a rotor angle;
   b. applying voltage pulses to phases of an ironless permanent magnet synchronous machine (PMSM) motor in a torque-forming direction of the rotor system, wherein the ironless PMSM motor is slotless and lacks a permeable core on which windings of a stator of the PMSM motor are wound;
   c. measuring current in the phases of the ironless PMSM motor;
   d. determining an expected back electromotive force (EMF) along a flux-forming axis, based on the measured current;
   e. forming an integral of the expected back EMF by time integration of the expected back EMF along the flux-forming axis only and/or forming a filter-based accumulation function; and
   f. determining the orientation of a rotor of the ironless PMSM motor from one or both of an algebraic sign of the integral of the expected back EMF and an algebraic sign of the accumulation function and correcting the rotor angle by either 0° or 180° based on the orientation found, wherein the orientation of the rotor is determined when the motor is at standstill.

2. The method of claim 1, wherein only the measured current at zero voltage at the phases of the ironless PMSM motor is used for determining the expected back EMF along the flux-forming axis.

3. The method of claim 1, wherein applying the voltage pulses is terminated as soon as the integral of the expected back EMF reaches a predetermined threshold value.

4. The method of claim 1, further comprising, after applying the voltage pulses, applying at least one counter pulse that moves the rotor back into an original position.

5. The method of claim 4, wherein the at least one counter pulse is applied in a negative torque-forming direction of the specified rotor system.

6. The method of claim 4, wherein the at least one counter pulse is applied in a negative torque-forming direction of the specified rotor system, the counter pulse being an integral of the applied voltage pulses.

7. The method of claim 4, wherein the at least one counter pulse is applied in a flux-forming direction of a given orientation of the rotor.

8. The method of claim 1, wherein the voltage pulses are rectangular pulses, with amplitude of the voltage pulses being varied over time.

9. The method of claim 8, wherein the amplitude of the voltage pulses is varied as a function of amplitude of the expected back EMF along the flux-forming axis.

10. The method of claim 1, wherein a time between two voltage pulses is varied.

11. The method of claim 1, wherein the expected back EMF along the flux-forming axis is filtered.

12. The method of claim 1, wherein the measured current is averaged over a number of measuring points for determining the expected back EMF along the flux-forming axis.

13. The method of claim 1, wherein a Kalman filter or a Luenberger observer is used for determining the expected back EMF along the flux-forming axis.

14. The method of claim 1, wherein a known rotor angle is determined by: g. applying the voltage pulses to the phases of the ironless PMSM motor; h. measuring the current in the phases; and i. determining the known rotor angle from the measured current, wherein only the measured current when zero voltage is applied to the phases of the ironless PMSM motor is used.

15. A permanent magnet synchronous machine (PMSM) motor system comprising:
   an ironless permanent magnet synchronous machine (PMSM) motor, wherein the ironless PMSM motor is slotless and lacks a permeable core on which windings of a stator of the PMSM motor are wound; and
   a motor control unit in communication with the ironless PMSM motor, the motor control unit comprising a processor and a memory and configured to:
   specify a rotor system according to a rotor angle;
   apply voltage pulses to phases of the ironless PMSM motor in a torque-forming direction of the rotor system;
   measure current in the phases of the ironless PMSM motor;
   determine an expected back electromotive force (EMF) along a flux-forming axis, based on the measured current;

form an integral of the expected back EMF by time integration of the expected back EMF along the flux-forming axis and/or form a filter-based accumulation function; and determine an orientation of a rotor of the ironless PMSM motor from one or both of an algebraic sign of the integral of the expected back EMF and an algebraic sign of the accumulation function and correct the rotor angle by either 0° or 180° based on the orientation found, wherein the orientation of the rotor is determined when the motor is at standstill.

16. The PMSM motor system of claim 15, wherein the memory is configured to store a predetermined threshold value of the integral of the expected back EMF.

17. The PMSM motor system of claim 16, wherein the motor control unit comprises a comparator configured to compare the integral of the expected back EMF to the predetermined threshold value.

18. The method of claim 1, wherein the ironless PMSM motor lacks sufficient induced saliency to allow for sensorless determination of the orientation of the rotor at standstill based on saturation induced saliency.

19. The PMSM motor system of claim 15, wherein the ironless PMSM motor lacks sufficient induced saliency to allow for sensorless determination of the orientation of the rotor at standstill based on saturation induced saliency.

* * * * *